United States Patent [19]

Moriya et al.

[11] Patent Number: 5,387,365
[45] Date of Patent: Feb. 7, 1995

[54] METAL SCAVENGERS FOR TREATING WASTE WATER

[75] Inventors: Masafumi Moriya, Iwakura; Kazuo Hosoda, Katsushika; Masatoshi Yoshida, Katsushika; Masayoshi Tsukanome, Katsushika, all of Japan

[73] Assignee: Miyoshi Yushi Kabushiki Kaisha, Tokyo, Japan

[21] Appl. No.: 970,876

[22] Filed: Nov. 3, 1992

Related U.S. Application Data

[63] Continuation-in-part of Ser. No. 837,609, Feb. 21, 1991, abandoned, which is a continuation-in-part of Ser. No. 574,067, Aug. 29, 1990, abandoned.

[30] Foreign Application Priority Data

Dec. 20, 1989 [JP] Japan ................... 1-330089
Jul. 13, 1990 [JP] Japan ................... 2-186744

[51] Int. Cl.$^6$ ............................................. C02F 5/10
[52] U.S. Cl. .................................. 252/180; 252/175; 252/80; 210/727
[58] Field of Search ............... 252/175, 180, 80; 210/719, 720, 727

[56] References Cited

U.S. PATENT DOCUMENTS

| | | | |
|---|---|---|---|
| 3,935,098 | 1/1976 | Oda et al. | 210/688 |
| 4,180,469 | 12/1979 | Anderson | 252/149 |
| 4,578,195 | 3/1986 | Moore et al. | 210/679 |
| 4,731,187 | 3/1988 | Moriya et al. | 210/719 |
| 5,130,051 | 7/1992 | Falk | 252/315.5 |

FOREIGN PATENT DOCUMENTS

| | | |
|---|---|---|
| 433580 | 6/1991 | European Pat. Off. . |
| 54-142861 | 7/1979 | Japan . |
| 81478 | 4/1987 | Japan . |
| 99679 | 4/1989 | Japan . |

*Primary Examiner*—Stephen Kalafut
*Assistant Examiner*—J. Silbermann
*Attorney, Agent, or Firm*—Sherman and Shalloway

[57] ABSTRACT

Metal scavengers suitable for use in the treatment of waste water are disclosed. The metal scavengers individually comprise a polyamine derivative and a polyethyleneimine derivative. The polyamine derivative is formed of a polyamine having a molecular weight not higher than 500 and contains, per molecule of the polyamine, at least one dithiocarboxyl group or a salt thereof as an N-substituting group substituted for an active hydrogen atom of the polyamine such that at least 30% of suitable active hydrogen atoms contained in the polyamine are substituted by the dithiocarboxyl group or salt thereof. The polyethyleneimine derivative is formed from a polyethyleneimine having an average molecular weight of at least 5,000 and contains, per molecule of the polyethyleneimine, at least one dithiocarboxyl group or a salt thereof as an N-substituting group substituted for an active hydrogen atom of the polyethyleneimine such that at least 40% of substitutable active hydrogen atoms contained in the polyethyleneimine are substituted by the dicarboxyl group or a salt thereof. The mixing ratio of the polyamine derivative to the polyethyleneimine derivative is about 9-7:1-3 by weight.

7 Claims, No Drawings

METAL SCAVENGERS FOR TREATING WASTE WATER

This application is a continuation-in-part of commonly assigned, copending application Ser. No. 07/837,609 filed Feb. 21, 1992 now abandoned, which is a continuation-in-part of commonly assigned parent application Ser. No. 7/574,067 filed Aug. 29, 1990, now abandoned.

BACKGROUND OF THE INVENTION

1. Field of the Invention

The present invention relates to metal scavengers and also to waste-water treatment processes using the metal scavengers.

2. Description of the Related Art

To cope with the ever-increasing contamination problem of rivers, seas and the like due to waste water from factories, more stringent regulations have been introduced to prevent waste water contamination. Current regulations require metals, contained in waste water, to be lowered to their corresponding prescribed concentrations before discharging it as an effluent into the environment. Further, various heavy metals are contained in slag discharged from mines, fly ash occurring upon incineration of waste at waste incineration plants, sludge produced as industrial waste upon neutralizing coagulation and sedimentation or coagulant-assisted sedimentation in the course of treatment of waste water, highly contaminated soil, and the like. Runoff of such heavy metals into underground water, rivers, and the seas has been increasingly causing problems. It is, therefore, a matter of urgent necessity to establish an effective process for the treatment of such heavy metals. Stringent regulations have been imposed for heavy metals harmful to the human body—such as mercury, cadmium, lead, zinc, copper and chromium. As far as waste water is concerned, a variety of processes have been proposed for the removal of metals. Known processes of this sort include ion flotation, ion exchanging, electrolytic floating, electrodialysis and reverse osmosis as well as the neutralizing coagulation and sedimentation in which an alkaline neutralizing agent such as calcium hydroxide or sodium hydroxide is added to convert metals into their hydroxides and the resultant metal hydroxides are coagulated and sedimented by a high molecular coagulant and then removed.

However, ion flotation, ion exchanging, electrolytic floating, electrodialysis and reverse osmosis involve problems in the degree of removal of heavy metals, operability, running cost, etc. Under these circumstances, these are used only for the treatment of certain special waste waters. On the other hand, the neutralizing coagulation and sedimentation process is accompanied by the problem that a sludge of metal hydroxides is formed in a large quantity but dewatering of this sludge is difficult as is its transportation due to the large volume. In addition, it is very difficult to remove heavy metals to levels below their respective effluent standards. Moreover, these sludges involve the problem that they may be dissolved again depending on the manner of disposal, thereby causing secondary contamination.

In contrast, the treatment of waste water by a metal scavenger can overcome the problems described above, so that metal scavengers are widely used in recent years. Of metal scavengers of this sort, there are known metal scavengers, each of which is composed of a polyamine derivative containing one or more dithiocarboxyl groups as functional groups. Various waste water processes making use of such metal scavengers have hence been proposed (for example, Japanese Patent Publication Nos. 39358/1981, 57920/1985 and 3549/1989 and Japanese Patent Application Laid-Open No. 65788/1987).

The above polyamine derivatives have excellent metal-scavenging efficiency and upon scavenging metal ions, form large floc of high sedimentation velocity. They can therefore perform the removal of metal ions from waste water more efficiently than conventional processes. However, adsorption of chromium (III), nickel, cobalt and manganese is still not considered sufficient. A cake obtained by separating and solidifying floc formed as a result of adsorption of metals on metal scavengers is disposed by incineration or by solidification with cement. When conventional metal scavengers are used, the cake has a relatively high water content. This may lead to a problem such that enormous energy is required upon incineration of the cake or the cake has a large volume and requires an unreasonably large amount of labor and money for its processing and disposal.

As a method for the disposal of metals contained in fly ash, sludge, slag or soil, it has heretofore been the practice to use such metal-containing waste for reclamation or landfilling or to dump it in the ocean after solidifying it with cement as is. These methods are not considered safe because there is the potential danger that such metals may run off through the cement layer. Hence, there has been a strong demand for the development of an absolutely safe disposal method.

SUMMARY OF THE INVENTION

The present invention has been completed to overcome the above problems. An object of the present invention is therefore to provide a metal scavenger which can more efficiently scavenge and remove a wide variety of metal ions in waste water, can reduce the water content of cake compared with the conventional metal scavengers and can improve the efficiency of the cake treatment and processing work. Another object of the present invention is to provide a process for the treatment of waste water by using such a metal scavenger. A further object of the present invention is to provide a process for the treatment of fly ash, sludge, slag, soil or the like, which contains at least one heavy metal, so that upon its disposal by solidification with cement and subsequent ocean dumping, reclamation or landfilling, the volume of cake can be reduced to save the cement to be used and hence to facilitate the disposal such as reclamation or landfilling and the heavy metal contained in the fly ash, sludge, slag, soil or the like can be firmly immobilized to prevent its runoff.

In one aspect of the present invention, there is thus provided a metal scavenger comprising:

a polyamine derivative containing, per molecule of a polyamine having a molecular weight not higher than 500, at least one dithiocarboxyl group or a salt thereof as an N-substituting group substituted for an active hydrogen atom of the polyamine; such that at least 30% of the substitutable active hydrogen atoms contained in the polyamine have been substituted by the dithiocarboxyl group or a salt thereof; and a polyethyleneimine derivative containing, per molecule of a polyethyleneimine having an average molecular weight of at least 5,000, at least one dithiocarboxyl group or a salt thereof as an N-substituting group substituted for an active hydrogen atom of the polyethyleneimine such that at least 40% of the substitutable polyethyleneimine have been substituted by the dithiocarboxyl group or salt thereof. The mixing ratio of polyamine derivative to the polyethyleneimine derivative is about 9-7:1-3 by weight.

In another aspect of the present invention, there is also provided a process for the treatment of waste water, which comprises adding the above metal scavenger to the waste water to adsorb metal ions contained in the waste water.

In a further aspect of the present invention, there is also provided a process for the treatment of contaminants such as fly ash, slag, soil or sludge containing at least one heavy metal, which comprises adding and mixing a metal scavenger with the fly ash, slag, soil or sludge to immobilize the heavy metal.

Since floc formed as a result of scavenging of metals is large and has a high sedimentation velocity, the waste-water treatment process of the present invention, making use of the metal ion scavenger of the present invention, can efficiently scavenge and remove metal ions from waste water. Moreover, the use of the metal scavenger of the present invention makes it possible to reduce the incorporation of water in floc compared with the use of the conventional scavengers, whereby cake obtained by separating and solidifying the floc has a lower water content to facilitate the disposal of the cake. In addition, the metal scavengers according to the present invention have excellent scavenging ability even for metal ions such as chromium (III), nickel, cobalt and manganese to which the conventional metal scavengers do not have good absorbability. They can therefore efficiently scavenge a still wider variety of metal ions than the conventional metal scavengers, bringing about a further advantage such that the range of applicable waste waters has been enlarged.

The metal scavengers of the present invention can be used in combination with a sodium sulfide. This wastewater treatment process can form floc having a greater sedimentation velocity, thereby bringing about another advantage that more efficient treatment of waste water can be performed.

According to the treatment process of this invention for fly ash, sludge, slag, soil or the like, one or more heavy metals contained therein can be firmly immobilized. When the thus-treated fly ash, sludge, slag, soil or the like is solidified with cement and then disposed by ocean dumping or reclamation or landfilling, there is no, or much less, danger that the heavy metals could run off through the cement layer. Moreover, the treatment by the present process makes it possible to reduce the volume of the material treated, so that the volume upon disposal can be reduced. This brings about advantages such that less cement is required for solidification and the handling of the treated waste upon its disposal can be facilitated.

DETAILED DESCRIPTION OF THE PREFERRED EMBODIMENTS

The polyamine derivative and polyethyleneimine derivative employed in this invention are compounds which contain at least one dithiocarboxyl group —CSSH or a salt thereof, for example, an alkali metal salt such as the sodium salt or potassium salt, an alkaline salt such as the calcium salt, the ammonium salt or the like (dithiocarboxyl group and its salts will hereinafter be called merely "dithiocarboxyl groups" collectively) as an N-substituting group substituted for an active hydrogen atom bonded to a nitrogen atom of a polyamine molecule containing primary and/or secondary amino groups or a polyethyleneimine molecule containing primary and/or secondary amino groups. These polyamine derivatives and polyethyleneimine derivatives can be obtained, for example, by reacting carbon disulfide with a polyamine and a polyethyleneimine, respectively. The active hydrogen atom of the terminal dithiocarboxyl group can be replaced by treating the reaction mixture with an alkali such as sodium hydroxide, potassium hydroxide or ammonium hydroxide after the completion of the above reaction or by conducting the above reaction in the presence of an alkali. The reaction of the polyamine or polyethyleneimine and carbon disulfide is conducted in a solvent, preferably water or an alcohol at 30°–100° C. for 1–10 hours, especially at 40°–70° C. for 2–5 hours.

At least 30%, and preferably from about 56 to 100% of the substitutable active hydrogen atoms contained in the polyamine are substituted by the dithiocarboxyl group and at least 40% and preferably from about 43% to about 99% of the substitutable active hydrogen atoms contained in the polyethyleneimine are substituted by the dithiocarboxyl group. The high rate of substitution provides the metal scavenger with much greater efficiency.

The polyamine forming the polyamine derivative which constitutes the metal scavenger of this invention is preferably polyamine having a molecular weight not greater than 500, most preferably a polyamine having a molecular weight of 60–250. Illustrative of the polyamine include alkylenediamines such as ethylenediamine, propylenediamine, butylenediamine and hexamethylenediamine; polyalkylenepolyamines such as diethylenetriamine, dipropylenetriamine, dibutylenetriamine, triethylenetetramine, tripropylenetetramine, tributylenetetramine, tetraethylenepentamine, tetrapropylenepentamine, tetrabutylenepentamine, pentaethylenehexamine, and polyamines represented by the formula H—(NH—CH$_2$CH$_2$CH)$_m$—NH—CH$_2$CH$_2$13 NH—(CH$_2$CH$_2$CH$_2$—NH)$_n$—H (wherein and n are integers such that m+n=1–8); phenylenediamine; o-, m- and p-xylenediamines; iminobispropylamine; monomethylaminopropylamine; methyliminobispropylamine; 1,3-bis(aminomethyl)cyclohexane; 1,3-diaminopropane; 1,4-diaminobutane; 3,5-diaminochlorobenzene; melamine; 1-aminoethylpiperazine; diaminophenyl ether; tolidine; m-toluylenediamine. They can be used either singly or in combination.

The polyethyleneimine forming the skeleton of the polyethyleneimine derivative as the other component of the metal scavenger of this invention is preferably a polyethyleneimine having an average molecular weight of at least 5,000, more preferably an average molecular weight of 10,000–200,000, most preferably a molecular weight of 20,000–150,000.

The above polyamine and polyethyleneimine, which hereinafter may be collectively called "polyamines", may also contain one or more alkyl, acyl and/or β-hydroxyalkyl groups as N-substituting groups. Introduction of one or more alkyl groups as N-substituting groups can be achieved by reacting the above polyamines (or polyamines with at least one dithiocarboxyl group introduced as a substituent) with an alkyl halide. To introduce one or more acyl groups as N-substituting groups, it is only necessary to react the above polyamines (or polyamines with at least one dithiocarboxyl group introduced as substituent) with an epoxyalkane. The N-substituting alkyl groups preferably contain 2-18 carbon atoms, while the N-substituting acyl groups preferably contain 2-30 carbon atoms. On the other hand, the N-substituted-$\beta$-hydroxyalkyl groups preferably contain 2-35 carbon atoms.

The metal scavenger of this invention is a mixture of the polyamine derivative containing at least one dithiocarboxyl group and the polyethyleneimine derivative containing at least one dithiocarboxyl group. The mixing ratio of the polyamine derivative to the polyethyleneimine derivative is 9-7:1-3 by weight.

The metal scavenger of this invention can efficiently scavenge out metals from waste water even when employed alone, as floc formed as a result of adsorption of the metals is large and moreover has a high sedimentation velocity. However, combined use of at least one of sodium sulfides such as sodium monosulfide, sodium polysulfides and sodium hydrogensulfide makes it possible to increase the sedimentation velocity of floc further so that still more efficient treatment is feasible. Exemplary sodium polysulfides include sodium disulfide, sodium trisulfide, sodium tetrasulfide and sodium pentasulfide. When the metal scavenger of this invention is used in combination with such a sodium sulfide, their mixing ratio may range from 1:99 to 99:1 with the range of from 20:80 to 98:2 being particularly preferred. When the metal scavenger of this invention and the sodium sulfide are employed in combination, they may be added to waste water after mixing them in advance or they may be added separately to waste water. The former addition is however preferred. When they are added separately, effects are substantially the same whichever additive is added first.

Upon addition of the metal scavenger of this invention to waste water, the metal scavenger can be used in an amount of 0.8-1.4 molar equivalents, especially 0.9-1.2 molar equivalents of the total amount of metal ions in the waste water when the metal scavenger is used alone. When it is used in combination with a sodium sulfide, they can be used in a total amount of 0.8-1.4 molar equivalents, notably 0.9-1.2 molar amounts of the total amount of metal ions in the waste water.

The metal scavenger of this invention can successfully scavenge metal ions in waste water over a pH range of 3-10. It is however particularly preferred to adjust the pH of waste water to a level in a range of 4-9. Any acid or alkali can be used to adjust the pH of waste water as long as it does not impair the formation of floc. In general, hydrochloric acid, sulfuric acid, nitric acid or the like is used as an acid while sodium hydroxide, potassium hydroxide or the like is employed as an alkali.

To immobilize one or more heavy metals contained in fly ash, sludge, slag or soil, with the metal scavenger of this invention, an aqueous solution of the metal scavenger in an amount about 1.2-3.0 times as much as that required to scavenge the heavy metals contained in the fly ash, sludge, slag or soil is added and mixed with the fly ash, sludge, slag or soil. Water may be added further to facilitate the mixing work. A pH range of 3-10 is preferred to scavenge heavy metals in slag. It is, therefore, preferable to adjust the pH of the slag with the above-described acid or alkali so that the slag has a pH in the above range upon its treatment with the metal scavenger.

The metal scavenger of this invention can scavenge metal ions such as mercury, cadmium, lead, zinc, copper, chromium (VI), arsenic, gold, silver, platinum, vanadium and thallium as efficiently as or more efficiently than conventional metal scavengers and moreover, can also efficiently scavenge metal ions whose scavenging is difficult by the conventional metal scavengers, such as chromium (III), nickel, cobalt and manganese.

The present invention will hereinafter be described in further detail by the following examples.

EXAMPLES 1-12 & COMPARATIVE EXAMPLES 1-17

Synthesis of certain polyamine derivatives and polyethyleneimine derivatives were conducted in the following manner.

SYNTHESIS OF POLYETHYLENEIMINE DERIVATIVE 1

Added to 333.3 parts by weight of a 30% aqueous solution of a polyethyleneimine having an average molecular weight of 10,000 were 400 parts by weight of a 10% aqueous solution of sodium hydroxide. The temperature of the resultant mixture was adjusted to 40° C. under stirring, followed by the gradual addition of 76 parts by weight of carbon disulfide. After completion of the addition, the reaction was allowed to proceed at 45° C. for 15 hours so that Polyethyleneimine Derivative 1 was obtained. The rate of substitution by the dithiocarboxyl group was 43%.

SYNTHESIS OF POLYETHYLENEIMINE DERIVATIVE 2

Added to 500 parts by weight of a 30% aqueous solution of a polyethyleneimine having an average molecular weight of 70,000 were 1,120 parts by weight of a 10% aqueous solution of sodium hydroxide. Carbon disulfide (212 parts by weight) were then reacted in a similar manner to the foregoing synthesis, whereby Polyethyeleneimine Derivative 2 was obtained. The rate of substitution by the dithiocarboxyl group was 80%.

SYNTHESIS OF POLYETHYLENEIMINE DERIVATIVE 3

Added to 500 parts by weight of a 30% aqueous solution of a polyethyleneimine having an average molecular weight of 100,000 were 1,400 parts by weight of a 10% aqueous solution of sodium hydroxide. Carbon disulfide (265 parts by weight) were then reacted in a similar manner to the foregoing syntheses, whereby Polyethyleneimine Derivative 3 was obtained. The rate of substitution by the dithiocarboxyl group was 97%.

SYNTHESIS OF POLYETHYLENEIMINE DERIVATIVE 4

Added to 500 parts by weight of a 30% aqueous solution of a polyethyleneimine having an average molecular weight of 1,200 were 1,400 parts by weight of a 10% aqueous solution of sodium hydroxide. Carbon disulfide (265 parts by weight) were then reacted in a similar manner to the foregoing syntheses, whereby Polyetheylenemine Derivative 4 was obtained. The rate of substitution by the dithiocarboxyl group was 99%.

SYNTHESIS OF POLYETHYLENEIMINE DERIVATIVE 5

Added to 500 parts by weight of 30% aqueous solution of a polyethelyeneimine having an average molecule weight of 3,500 were 1,120 parts by weight of a 10% aqueous solution of sodium hydroxide. Carbon disulfide (212 parts by weight) was then reacted in a similar manner to the foregoing synthesis, whereby Polyethyleneimine Derivative 5 was obtained. The rate of substitution by the dithiocarboxyl group was 80%.

SYNTHESIS OF POLYETHYLENEIMINE DERIVATIVE 6

Added to 500 parts by weight of a 30% aqueous solution of a polyethyleneimine having an average molecular weight of 40,000 were 1,400 parts by weight of a 10% aqueous solution of a sodium hydroxide. Carbon disulfide (265 parts by weight) was then reacted in a similar manner to the foregoing synthesis, whereby Polyethyleneimine Derivative 6 was obtained. The rate of substitution by the dithiocarboxyl group was 99%.

SYNTHESIS OF POLYETHYLENEIMINE DERIVATIVE 7

Added to 500 parts by weight of a 30% aqueous solution of a polyethyleneimine having an average molecular weight of 7,800 were 1,400 parts by weight of a 10% aqueous solution of sodium hydroxide. Carbon disulfide (265 parts by weight) was then reacted in a similar manner to the foregoing synthesis, whereby Polyethyleneimine Derivative 7 was obtained. The rate of substitution by the dithiocarboxyl group was 99%.

SYNTHESIS OF POLYETHYLENEIMINE DERIVATIVE 8

Added to 500 parts by weight of a 30% aqueous solution of a polyethyleneimine having an average molecular weight of 70,000 were 1,050 parts by weight of a 4% aqueous solution of sodium hydroxide. Carbon disulfide (79.5 parts by weight) were then reacted in a similar manner to the foregoing syntheses, whereby Polyethyleneimine Derivative 8 was obtained. The rate of substitution by the dithiocarboxyl group was 30%.

SYNTHESIS OF POLYAMINE DERIVATIVE 1

Charged in a four-neck flask were 40 g of ethylenediamine (molecular weight: 60) and 536 g of a 20% aqueous solution of sodium hydroxide. At 40° C. 203 7 g of carbon disulfide were added dropwise under vigorous agitation through a dropping funnel. After completion of the dropwise addition, aging was conducted for 4 hours at the same temperature so that Polyamine Derivative 1 was obtained. The rate of substitution by the dithiocarboxyl group was 100%.

SYNTHESIS OF POLYAMINE DERIVATIVE 2

Charged in a similar apparatus were 101g of triethylenetetramine (molecular weight: 146) and 464 g of a 20% aqueous solution of sodium hydroxide. Carbon disulfide (176.3 g) was reacted in a manner similar to the above synthesis of Polyamine Derivative 1, whereby Polyamine Derivative 2 was obtained. The rate of substitution by the dithiocarboxyl group was 56%.

SYNTHESIS OF POLYAMINE DERIVATIVE 3

Charged in a similar apparatus were 48.5 of diethylenetriamine (molecular weight: 103) and 384 g of water. The resultant mixture was heated to 60° C. followed by the addition of 145.9 g of carbon disulfide through a dropping funnel. After completion of the dropwise addition, aging was conducted for 4 hours at the same temperature. The reaction mixture was then heated to 70°–75° C., followed the addition of 384 g of a 20% aqueous solution of sodium hydroxide. They were reacted for 1.5 hours, whereby Polyamine Derivative 3 was obtained. The rate of substitution by the dithiocarboxyl group was 82%.

SYNTHESIS OF POLYAMINE DERIVATIVE 4

Charged were 90.2 g of N-propyltriethylenetetramine (molecular weight: 188) and 640 g of a 15% aqueous solution of sodium hydroxide. Carbon disulfide (172.8 g) was reacted in a manner similar to the synthesis of Polyamine Derivative 1, whereby Polyamine Derivative 4 was obtained. The rate of substitution by the dithiocarboxyl group was 95%.

SYNTHESIS OF POLYAMINE DERIVATIVE 5

Charged were 91.5 g of $\beta$-hydroxypropylpentaethylenehexamine (molecular weight: 290) and 296 g of a 20% aqueous solution of sodium hydroxide. Carbon disulfide (112.5 g) was reacted in a manner similar to the synthesis of Polyamine Derivative 1, whereby Polyamine Derivative 5 was obtained. The rate of substitution by the dithiocarboxyl group was 78%.

SYNTHESIS OF POLYAMINE DERIVATIVE 6

Charged were 44 g of $\beta$-hydroxyalkyl ($C_{10}$–$C_{12}$) pentaethylenehexamine (molecular weight: 437) and 536 g of a 3.7% aqueous solution of sodium hydroxide. Carbon disulfide (38 g) was reacted in a similar manner to the synthesis of Polyamine Derivative 1, whereby Polyamine Derivative 6 was obtained. The rate of substitution by the dithiocarboxyl group was 70%.

SYNTHESIS OF POLYAMINE DERIVATIVE 7

Charged were 154 g of a reaction product (molecular weight: 642) obtained by reacting pentaethylenehexamine with 1,2-epoxyalkane ($C_{10}$–$C_{12}$) and 1,200 g of a 4% aqueous solution of sodium hydroxide. Carbon disulfide (91.2 g) was reacted in a manner similar to the synthesis of Polyamine Derivative 1, whereby Polyamine Derivative 7 was obtained. The rate of substitution by the dithiocarboxyl group was 83%.

SYNTHESIS OF POLYAMINE DERIVATIVE 8

Charged in a similar apparatus were 30 g of ethylenediamine (molecular weight: 60) and 810 g of a 2.5% aqueous solution of sodium hydroxide. Carbon disulfide (38 g) was reacted in a manner similar to the above Synthesis of Polyamine Derivative 1, whereby Polyamine Derivative 8 was obtained. The rate of substitution by the dithiocarboxyl group was 25%.

Four kinds of aqueous solutions were treated using metal scavengers which were obtained by mixing the above-obtained polyethyleneimine derivative and polyamine derivative and if necessary, sodium sulfides in the proportions given below (all solid wt %). Note that Polyethyleneimine Derivative 2 and Polyethylene Derivative 1 were used singly in Comparative Examples 1 and 2, respectively.

| COMPOSITIONS OF METAL SCAVENGERS | | | |
|---|---|---|---|
| | Rate of Substitution of dithiocarboxyl group (%) | MW | Mixing Ratio (wt %) |
| Example 1 | | | |
| Polyethyleneimine Derivative 3 | 97 | 100,000 | 1.3 |
| Polyamine Derivative 1 | 100 | 60 | 8.7 |
| Example 2 | | | |
| Polyethyleneimine Derivative 2 | 80 | 70,000 | 2.8 |
| Polyamine Derivative 2 | 56 | 146 | 7.2 |
| Example 3 | | | |
| Polyethyleneimine Derivative 1 | 43 | 10,000 | 2 |
| Polyamine Derivative 3 | 82 | 103 | 8 |
| Example 4 | | | |
| Polyethyleneimine Derivative 2 | 80 | 70,000 | 1.5 |
| Polyamine Derivative 4 | 95 | 188 | 8.5 |
| Example 5 | | | |
| Polyethyleneimine Derivative 3 | 97 | 100,000 | 2.5 |

-continued

COMPOSITIONS OF METAL SCAVENGERS

| | Rate of Substitution of dithiocarboxyl group (%) | MW | Mixing Ratio (wt %) |
|---|---|---|---|
| Polyamine Derivative 5 | 78 | 290 | 7.5 |
| Example 6 | | | |
| Metal Scavenger of Example 1 | | | 8.0 |
| Sodium monosulfide | | | 2.0 |
| Example 7 | | | |
| Metal Scavenger of Example 3 | | | 9.0 |
| Sodium pentasulfide | | | 1.0 |
| Example 8 | | | |
| Metal Scavenger of Example 5 | | | 8.5 |
| Sodium hydrogensulfide | | | 1.5 |
| Example 9 | | | |
| Polyethyleneimine Derivative 7 | 99 | 7,800 | 1.2 |
| Polyamine Derivative 6 | 70 | 437 | 8.8 |
| Example 10 | | | |
| Polyethyleneimine Derivative 6 | 99 | 40,000 | 1.8 |
| Polyamine Derivative 6 | 70 | 437 | 8.2 |
| Example 11 | | | |
| Polyethyleneimine Derivative 7 | 99 | 7,800 | 2.3 |
| Polyamine Derivative 4 | 95 | 188 | 7.7 |
| Example 12 | | | |
| Polyethyleneimine Derivative 6 | 99 | 40,000 | 2.6 |
| Polyamine Derivative 4 | 95 | 188 | 7.4 |
| Comparative Example 1 | | | |
| Polyethyleneimine Derivative 2 (80% substitutions, MW = 70,000) was used singly. | | | |
| Comparative Example 2 | | | |
| Polyamine Derivative 1 (100% substitutions, MW = 60) was used singly. | | | |
| Comparative Example 3 | | | |
| Polyethyleneimine Derivative 4 | 99 | 1,200 | 1.3 |
| Polyamine Derivative 1 | 100 | 60 | 8.7 |
| Comparative Example 4 | | | |
| Metal Scavenger of Comp. Ex. 3 | | | 8.0 |
| Sodium monosulfide | | | 2.0 |
| Comparative Example 5 | | | |
| Polyethyleneimine Derivative 5 | 90 | 3,500 | 2.1 |
| Polyamine Derivative 5 | 78 | 290 | 7.9 |
| Comparative Example 6 | | | |
| Polyethyleneimine Derivative 5 | 80 | 3,500 | 1.6 |
| Polyamine Derivative 2 | 56 | 146 | 8.4 |
| Comparative Example 7 | | | |
| Polyethyleneimine Derivative 1 | 43 | 10,000 | 2.0 |
| Polyamine Derivative 7 | 83 | 642 | 8.0 |
| Comparative Example 8 | | | |
| Polyethyleneimine Derivative 5 | 80 | 3,500 | 2.0 |
| Polyamine Derivative 7 | 83 | 642 | 8.0 |
| Comparative Example 9 | | | |
| Polyethyleneimine Derivative 1 | 43 | 10,000 | 2.0 |
| Polyamine Derivative 8 | 25 | 60 | 8.0 |
| Comparative Example 10 | | | |
| Polyethyleneimine Derivative 8 | 30 | 70,000 | 1.5 |
| Polyamine Derivative 2 | 56 | 146 | 8.5 |
| Comparative Example 11 | | | |
| Polyethyleneimine Derivative 3 | 97 | 100,000 | 0.5 |
| Polyamine Derivative 1 | 100 | 60 | 9.5 |
| Comparative Example 12 | | | |
| Polyethyleneimine Derivative 7 | 99 | 7,800 | 0.5 |
| Polyamine Derivative 6 | 70 | 43 | 9.5 |
| Comparative Example 13 | | | |
| Polyethyleneimine Derivative 2 | 80 | 70,000 | 4.0 |
| Polyamine Derivative 4 | 95 | 188 | 6.0 |
| Comparative Example 14 | | | |
| Polyethyleneimine Derivative 3 | 97 | 100,000 | 4.0 |
| Polyamine Derivative 1 | 100 | 60 | 6.0 |
| Comparative Example 15 | | | |
| Polyethyleneimine Derivative 8 | 30 | 70,000 | 2.0 |
| Polyamine Derivative 8 | 25 | 60 | 8.0 |
| Comparative Example 16 | | | |
| Polyethyleneimine Derivative 3 | 97 | 100,000 | 1.3 |
| Polyamine Derivative 8 | 25 | 60 | 8.7 |
| Comparative Example 17 | | | |
| Polyethyleneimine Derivative 8 | 30 | 70,000 | 2.8 |
| Polyamine Derivative 2 | 56 | 146 | 7.2 |

The aqueous solutions provided for the treatment were an aqueous nickel solution [content of nickel, (II) ions: 50 ppm, pH: 6.8], an aqueous manganese solution [content of manganese (II) ions: 50 ppm, pH: 5.6], an aqueous cobalt solution [content of cobalt (II) ions: 50 ppm, pH: 4.6], and an aqueous chromium solution [content of chromium (III) ions: 50 ppm, pH: 4.0].

Treatment was conducted in the following manner. One liter portions of each of the aqueous solutions to be treated were respectively added with 70 mg of the metal scavengers (as mixtures of the metal scavengers and the corresponding sodium sulfides in Examples 6, 7 and 8 and Comparative Example 4). Each of the resultant mixtures was stirred for 5 minutes and then left over. The time until sedimentation of formed sedimentation was measured. After the floc thus formed was filtered off, the concentrations of metal ions remaining in the filtrate were measured by atomic absorption spectrometry. The measurement results of floc sedimentation time, the quantity of the floc formed, the water content of cake formed as a result of collection of the floc by filtration and the concentrations of metal ions remaining in the filtrate are summarized in Tables I, II and III. Table III shows the eluted amount of metal. The elution test was performed in accordance with the method of notification No. 13 of the Environmental Agency, the Government of Japan, incorporated herein by reference thereto. The water content of the cake is shown by expressing, in terms of wt %, the amount of evaporated water as measured by the infrared irradiation method.

TABLE I

| | Floc sedimentation time (min) | | | | Quantity of floc formed (ml) | | | |
|---|---|---|---|---|---|---|---|---|
| EXAMPLE | Aqueous Mn(II) soln. | Aqueous Ni(II) soln. | Aqueous Co(II) soln. | Aqueous Cr(III) soln. | Aqueous Mn(II) soln. | Aqueous Ni(II) soln. | Aqueous Co(II) soln. | Aqueous Cr(III) soln. |
| 1 | 22 | 28 | 23 | 25 | 36 | 37 | 35 | 30 |
| 2 | 25 | 29 | 26 | 27 | 35 | 38 | 36 | 32 |
| 3 | 29 | 31 | 29 | 31 | 38 | 38 | 34 | 33 |
| 4 | 24 | 29 | 25 | 26 | 37 | 39 | 38 | 34 |
| 5 | 21 | 28 | 23 | 24 | 35 | 36 | 39 | 28 |
| 6 | 24 | 29 | 26 | 28 | 34 | 37 | 36 | 27 |
| 7 | 22 | 27 | 24 | 24 | 36 | 36 | 36 | 29 |
| 8 | 23 | 28 | 25 | 26 | 35 | 35 | 37 | 30 |
| 9 | 23 | 31 | 24 | 24 | 37 | 35 | 36 | 33 |

TABLE I-continued

| | | | | | | | | |
|---|---|---|---|---|---|---|---|---|
| 10 | 26 | 29 | 25 | 27 | 39 | 37 | 38 | 36 |
| 11 | 22 | 27 | 23 | 24 | 36 | 38 | 37 | 31 |
| 12 | 24 | 28 | 26 | 29 | 36 | 35 | 35 | 32 |

| | Water content of cake (%) | | | | Remaining metal ion concentration (ppm) | | | |
|---|---|---|---|---|---|---|---|---|
| | | | | | Aqueous Mn(II) soln. | Aqueous Ni(II) soln. | Aqueous Co(II) soln. | Aqueous Cr(III) soln. |
| EXAMPLE | Mn(II) | Ni(II) | Co(II) | Cr(III) | | | | |
| 1 | 80 | 79 | 78 | 80 | 1.0 | 2.5 | 1.4 | 2.1 |
| 2 | 77 | 79 | 81 | 79 | 2.3 | 3.3 | 2.6 | 2.8 |
| 3 | 80 | 81 | 79 | 80 | 1.8 | 2.4 | 2.0 | 2.2 |
| 4 | 78 | 79 | 78 | 79 | 1.4 | 2.5 | 2.1 | 2.3 |
| 5 | 77 | 78 | 79 | 77 | 0.9 | 1.8 | 1.3 | 1.4 |
| 6 | 79 | 77 | 77 | 80 | 1.1 | 2.4 | 1.4 | 2.1 |
| 7 | 79 | 81 | 79 | 79 | 0.9 | 2.2 | 1.2 | 2.0 |
| 8 | 76 | 77 | 79 | 78 | 1.0 | 2.5 | 1.3 | 1.9 |
| 9 | 80 | 79 | 80 | 81 | 1.2 | 2.5 | 1.8 | 2.2 |
| 10 | 78 | 80 | 79 | 79 | 1.0 | 2.4 | 1.2 | 2.3 |
| 11 | 79 | 80 | 79 | 81 | 1.4 | 2.2 | 2.2 | 2.2 |
| 12 | 77 | 79 | 78 | 80 | 1.5 | 2.5 | 2.3 | 2.4 |

TABLE II

| | Floc sedimentation time (min) | | | | Quantity of floc formed (ml) | | | |
|---|---|---|---|---|---|---|---|---|
| COMPARATIVE EXAMPLE | Aqueous Mn(II) soln. | Aqueous Ni(II) soln. | Aqueous Co(II) soln. | Aqueous Cr(III) soln. | Aqueous Mn(II) soln. | Aqueous Ni(II) soln. | Aqueous Co(II) soln. | Aqueous Cr(III) soln. |
| 1 | 40 | 42 | 41 | 39 | 80 | 82 | 81 | 80 |
| 2 | 45 | 48 | 49 | 44 | 85 | 88 | 87 | 84 |
| 3 | 42 | 44 | 44 | 42 | 83 | 84 | 83 | 82 |
| 4 | 35 | 33 | 36 | 35 | 51 | 52 | 51 | 50 |
| 5 | 39 | 41 | 40 | 44 | 51 | 53 | 50 | 52 |
| 6 | 43 | 40 | 39 | 42 | 57 | 61 | 56 | 59 |
| 7 | 45 | 50 | 49 | 42 | 85 | 88 | 86 | 83 |
| 8 | 47 | 51 | 53 | 46 | 86 | 89 | 87 | 85 |
| 9 | 68 | 62 | 64 | 61 | 52 | 54 | 53 | 51 |
| 10 | 66 | 58 | 60 | 57 | 47 | 50 | 48 | 49 |
| 11 | 30 | 33 | 33 | 30 | 42 | 44 | 41 | 39 |
| 12 | 31 | 38 | 30 | 29 | 45 | 47 | 48 | 42 |
| 13 | 26 | 31 | 28 | 29 | 41 | 42 | 41 | 39 |
| 14 | 29 | 33 | 29 | 31 | 44 | 46 | 43 | 40 |
| 15 | 65 | 54 | 57 | 55 | 55 | 59 | 53 | 58 |
| 16 | 67 | 61 | 64 | 62 | 53 | 53 | 51 | 49 |
| 17 | 67 | 59 | 59 | 60 | 49 | 51 | 49 | 52 |

| | Water content of cake (%) | | | | Remaining metal ion concentration (ppm) | | | |
|---|---|---|---|---|---|---|---|---|
| | | | | | Aqueous Mn(II) soln. | Aqueous Ni(II) soln. | Aqueous Co(II) soln. | Aqueous Cr(III) soln. |
| COMPARATIVE EXAMPLE | Mn(II) | Ni(II) | Co(II) | Cr(III) | | | | |
| 1 | 93 | 92 | 93 | 91 | 3.2 | 6.3 | 4.4 | 4.8 |
| 2 | 93 | 94 | 94 | 92 | 4.5 | 10.2 | 9.8 | 8.3 |
| 3 | 91 | 92 | 91 | 93 | 3.2 | 5.8 | 4.4 | 4.9 |
| 4 | 86 | 89 | 87 | 89 | 2.9 | 4.2 | 3.0 | 3.3 |
| 5 | 85 | 87 | 89 | 86 | 2.1 | 3.9 | 3.2 | 3.4 |
| 6 | 86 | 91 | 87 | 87 | 2.2 | 3.6 | 2.9 | 3.5 |
| 7 | 86 | 89 | 86 | 88 | 3.3 | 6.4 | 5.0 | 5.2 |
| 8 | 88 | 91 | 89 | 91 | 4.1 | 10.0 | 9.2 | 8.6 |
| 9 | 93 | 94 | 92 | 90 | 10.1 | 10.4 | 12.4 | 10.2 |
| 10 | 93 | 92 | 93 | 91 | 12.1 | 11.6 | 14.3 | 11.8 |
| 11 | 85 | 83 | 82 | 84 | 1.1 | 2.8 | 1.6 | 2.3 |
| 12 | 82 | 84 | 85 | 86 | 1.4 | 2.9 | 2.1 | 2.9 |
| 13 | 90 | 89 | 90 | 90 | 1.5 | 2.7 | 2.3 | 2.6 |
| 14 | 85 | 84 | 84 | 86 | 1.4 | 2.9 | 1.8 | 2.9 |
| 15 | 92 | 92 | 95 | 94 | 16.3 | 15.4 | 19.2 | 17.4 |
| 16 | 90 | 91 | 89 | 87 | 9.2 | 8.6 | 10.1 | 8.1 |
| 17 | 93 | 93 | 92 | 91 | 11.2 | 10.4 | 12.6 | 9.8 |

TABLE III

| | ELUTED AMOUNT OF METAL (ppm) | | | |
|---|---|---|---|---|
| | Mn | Ni | Co | Cr |
| EXAMPLE | | | | |
| 1 | 0.9 | 1.0 | 0.9 | 0.2 |
| 2 | 2.0 | 1.3 | 1.4 | 0.3 |
| 3 | 1.6 | 0.9 | 1.2 | 0.2 |
| 4 | 1.2 | 1.0 | 1.2 | 0.3 |
| 5 | 0.6 | 0.7 | 0.8 | 0.1 |

TABLE III-continued

| | ELUTED AMOUNT OF METAL (ppm) | | | |
|---|---|---|---|---|
| | Mn | Ni | Co | Cr |
| 6 | 1.1 | 1.7 | 1.4 | 0.5 |
| 7 | 0.9 | 1.5 | 1.2 | 0.4 |
| 8 | 0.9 | 2.0 | 0.9 | 0.2 |
| 9 | 1.3 | 1.0 | 1.1 | 0.2 |
| 10 | 0.9 | 1.2 | 0.8 | 0.3 |
| 11 | 1.5 | 2.0 | 1.1 | 0.2 |
| 12 | 1.5 | 1.8 | 1.4 | 0.4 |

TABLE III-continued

| ELUTED AMOUNT OF METAL (ppm) | | | | |
|---|---|---|---|---|
| | Mn | Ni | Co | Cr |
| COMPARATIVE EXAMPLE | | | | |
| 1 | 1.8 | 1.9 | 1.4 | 0.6 |
| 2 | 4.2 | 5.6 | 6.5 | 2.3 |
| 3 | 4.0 | 3.5 | 2.3 | 1.9 |
| 4 | 3.1 | 4.1 | 2.5 | 2.4 |
| 5 | 2.4 | 3.9 | 2.8 | 0.5 |
| 6 | 2.3 | 2.4 | 2.3 | 0.6 |
| 7 | 2.9 | 4.2 | 4.3 | 1.3 |
| 8 | 4.0 | 5.1 | 5.6 | 1.6 |
| 9 | 10.3 | 8.2 | 7.3 | 3.9 |
| 10 | 9.4 | 7.6 | 6.9 | 3.2 |
| 11 | 3.5 | 4.5 | 5.1 | 1.6 |
| 12 | 3.4 | 4.2 | 4.4 | 1.0 |
| 13 | 1.8 | 1.4 | 2.0 | 0.9 |
| 14 | 1.1 | 1.2 | 1.2 | 0.4 |
| 15 | 3.2 | 10.4 | 7.3 | 5.4 |
| 16 | 9.9 | 8.0 | 7.0 | 3.7 |
| 17 | 9.1 | 7.2 | 6.5 | 3.0 |

TABLE IV

| | Eluted amount of metal (ppm) | | | | | | | Bulk density (g/cm$^3$) |
|---|---|---|---|---|---|---|---|---|
| | Pb | Cd | Zn | Cr | Hg | Cu | Ni | |
| Example 13 | 0.20 | ND* | 0.31 | 0.10 | ND | ND | 0.1 | 1.0 |
| Untreated fly ash | 50.3 | 0.25 | 15.3 | 0.45 | 0.06 | 0.09 | 1.4 | 0.3 |

EXAMPLE 13

To 50 g of fly ash produced by incineration of waste and containing 950 ppm of lead, 125 ppm of cadmium, 5300 ppm of zinc, 130 ppm of entire chromium, 13 ppm of mercury, 160 ppm of copper and 4 ppm of nickel, 1 g of the same metal scavenger as that employed in Example 2 were added as an aqueous solution in 10 g of water. The resultant mass was kneaded thoroughly at 65°–70° C. for 20 minutes. With respect to the ash thus kneaded and treated and allowed to cool down to room temperature and the untreated ash, elution tests were conducted in the manner set out in Notification No. 13 of the Environment Agency, the Government of Japan. The amounts of metal eluted and the bulk densities of the ash samples both before and after the treatment were measured. The results are shown in Table IV.

EXAMPLE 14

To 50 g of sludge (water content: 82%) obtained by treatment of waste water from a waste incineration plant and containing 25 ppm of mercury, 108 ppm of lead, 2 ppm of cadmium, 160 ppm of zinc and 3 ppm of nickel, 0.1 g of the same metal scavenger as that employed in Example 1 was added. The resultant mixture was mixed thoroughly for 20 minutes, followed by filtration. The concentrations of metals in the resultant filtrate were measured. The filtrate was found to contain 0.002 ppm of mercury and 0.3 ppm of lead, but cadmium, nickel and zinc were not detected.

COMPARATIVE EXAMPLE 18

Polyethyleneimine derivative 2 (0.1 g) was added to 50 g of the same sludge as that treated in Example 14, followed by thorough mixing for 20 minutes. The resultant mixture was filtered and the concentrations of metals in the filtrate were measured. The filtrate was found to contain 0.03 ppm of mercury, 1.2 ppm of lead, 0.5 ppm of cadmium, 20 ppm of zinc, and 2 ppm of nickel.

EXAMPLE 15

To 50 g of slag containing, as metals, 0.014 ppm of mercury, 330 ppm of cadmium, 220 ppm of lead, 0.7 ppm of chromium and 100 ppm of copper, 0.5 g of the same metal scavenger as that employed in Example 5 was added as an aqueous solution in 5 g of water. The resultant mass was kneaded thoroughly for 20 minutes. With respect to the slag thus kneaded and treated, an elution test was conducted to measure the amount of metals eluted. As a result, detected were 0.001 ppm of mercury, 0.1 ppm of cadmium, 0.2 ppm of lead and 0.3 ppm of copper. Chromium was not detected.

We claim:

1. A metal scavenger comprising:
 a polyamine derivative formed from a polyamine having a molecular weight not higher than 500, said polyamine derivative containing, per molecule of said polyamine, at least one dithiocarboxyl group or a salt thereof as an N-substituting group or a salt thereof for an active hydrogen atom of said polyamine such that from about 56% to about 99% of substitutable active hydrogen atoms contained in the polyamine are substituted by said dithiocarboxyl group or a salt thereof; and
 a polyethyleneimine derivative formed from a polyethyleneimine having an average molecular weight of at least 5,000, said polyethyleneimine derivative containing, per molecule of said polyethyleneimine, at least one dithiocarboxyl group or a salt thereof as an N-substituting group substituted for an active hydrogen atom of said polyethyleneimine, such that from about 43% to about 99% of substitutable active hydrogen atoms contained in the polyethyleneimine are substituted by said dithiocarboxyl group or a salt thereof;
 wherein the mixing ratio of the polyamine derivative to the polyethyleneimine derivative is about 9:1 to 7:3.

2. The metal scavenger of claim 1, wherein the polyamine has a molecular weight of from about 60 to about 250.

3. The metal scavenger of claim 1, wherein the polyethyleneimine has a molecular weight of from 10,000 to about 200,000.

4. The metal scavenger of claim 1, wherein at least one of the polyamine derivatives and polyethyleneimine derivatives contains at least one additional N-substituting group selected from the group consisting of alkyl groups, acyl groups and β-hydroxyalkyl groups.

5. The metal scavenger of claim 4, wherein the additional N-substituting group is an alkyl group having from 2 to 18 carbon atoms.

6. The metal scavenger of claim 4, wherein the additional N-substituting group is an acyl group having from 2 to 30 carbon atoms.

7. The metal scavenger of claim 4, wherein the additional N-substituting group is a β-hydroxyalkyl group having 4–35 carbon atoms.

* * * * *